July 13, 1937.  C. D. FATOR  2,086,545

AIRPLANE BOOSTER

Filed Dec. 7, 1936

Inventor
Charles D Fator.
By Adam Richmond
Attorney

Patented July 13, 1937

2,086,545

UNITED STATES PATENT OFFICE 2,086,545

AIRPLANE BOOSTER

Charles D. Fator, San Antonio, Tex.

Application December 7, 1936, Serial No. 114,649

7 Claims. (Cl. 244—52)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to control apparatus for airplanes, more particularly it is directed to an emergency control booster to right the position of the plane instantly when it is diverted from its course beyond control of the ordinary steering apparatus.

One object of the invention is to provide an emergency control apparatus which will prevent spins or stalls particularly at low altitudes.

Another object of the invention is to prevent nosing over when landing or taking off, particularly on a soft field.

Other objects of the invention are to provide greater safety in flying, particularly while training, in flight tests and also to prevent whip spins.

With these and other objects in view this invention consists in certain novel details of construction, combination and arrangement of parts to be more fully hereinafter described and set forth in the accompanying claims.

Referring more particularly to the accompanying drawing in which corresponding parts are indicated by similar reference characters:

Figure 1:
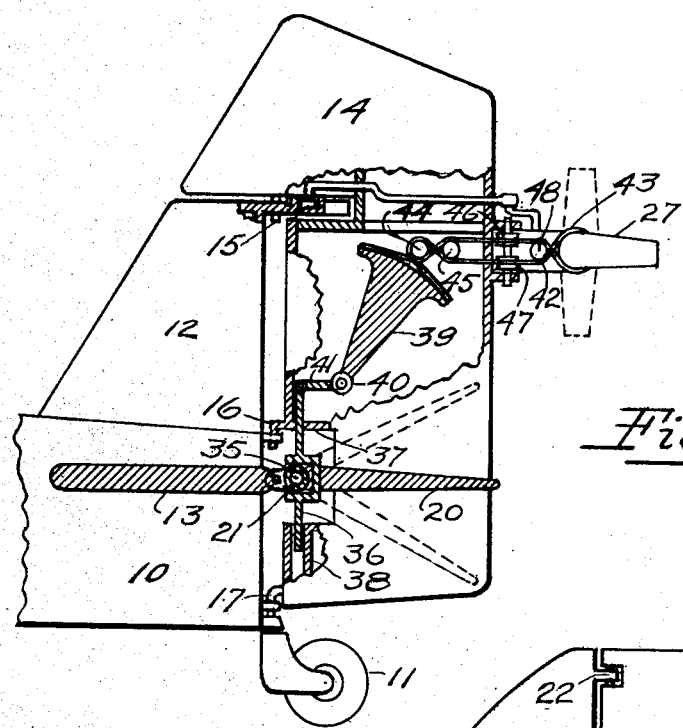
Fig. 1 is a side view partially in section of an airplane tail (airfoil control group) showing the method of attachment of the emergency booster and the elevating and depressing mechanism.

Briefly stated, this invention consists of a booster device comprising an auxiliary rocket engine which is attached to the tail of an airplane and which is adapted to be turned at an angle by a mechanism controlled by the rudder and elevators. The auxiliary engine is utilized to discharge gas into the surrounding atmosphere to thus change the angle of direction of the airplane when it has gotten off of its course.

In flying the present day type of airplane, directional (yaw) and lateral (rolling) and elevation (pitch) control is maintained by the pilot manipulating his hand controls to cause to be operated certain respective airfoil controls that are operatively mounted in proper position, in the air-stream on the airplane. Unfortunately, from the standpoint of danger in losing control of an airplane in flight, the effectual action of the airfoil controls is dependent upon the flow of the air stream over their surfaces, being more or less direct and above the critical (minimum) velocity, i. e., the air-stream must be of sufficient velocity and actually pass over the surfaces of the airfoil controls. Thus if the airplane in flight is caused to fall below the critical speed, not only do the wings cease to support the weight of the airplane, but the airfoil controls, especially the rudder and the elevators, are rendered ineffectual, the airplane is said to be stalled or out of control.

Stalls may be caused by climbing too steeply, by failure of the engine, by terrific wind gusts, or lack of skill of the operator, and when not corrected quickly enough, may result in loss of altitude, side slip or spin, or a whip-stall or spin, wherein the nose whips under and the airplane tends to get onto its back.

To recover from a stall the airplane must regain its flying speed, and owing to the fact that the flight controls become increasingly ineffectual in proportion to the degree of stall some outside force is necessary to supplant or boost the regular controls to permit the pilot to force the airplane back into control, to recover it from its divergent course, and it is for this purpose that the apparatus which forms the subject matter of the invention was devised.

It has been proved that if the rudder and elevators of an airplane are effectual, the airplane may be recovered from any known maneuver and therefore this invention has been developed as pertaining to the tail group of the airplane, where it functions to apply a controlled and directed booster force at the point normally acted upon by the force of the usual rudder and elevator airfoil control surfaces. This booster force is controlled and directed by the instant position of the rudder and elevators and acts in the identical direction and with the relative strength as would prevail were the said rudder and elevator airfoil controls effectual, as will be further described.

Referring to the drawing the numeral (10) indicates the tail end of a fuselage or outrigger on which the tail group controls are mounted, (11) indicates the conventional tail wheel caster and (12) and (13) the vertical and horizontal stabilizer airfoil fins. The numeral (14) indicates the rudder and (15), (16) and (17) the usual hinge pins for pivoting the same.

The elevator unit is indicated by the numeral (18), and the right and left elevators by (19) and (20) respectively, which are rigidly attached to a common axle (21) supported by four bearing brackets, three of which are shown in the drawings as at (22), (23) and (24). A cam bracket (25) is attached to the horizontal stabilizer fin (13), the former supporting a cam (26), the operation of which will be further described.

At the rear edge of the rudder (14) a rocket gun (27) is supported by a universal bracket (28). The gun is provided with a cover plate (51) and is adapted to receive an explosive charge (29), which may be electrically ignited through the ignition wires (30), which lead to a source of power, and a manual control switch conveniently located in the cockpit for operation by the pilot. Said power source and control switch are not shown in the illustrations. The universal bracket (28) is made up of a horizontally and vertically movable sections (29) and (30), which permit direction of the gun into proper firing position to right the airplane from its diverted course.

The movement of the gun in a horizontal plane is effected by means of a link (31) mounted in a bearing member (32), said link being connected at one end through a universal joint to a gun arm (33) and at the other end it is provided with a cam roller (34) which fits within the groove of cam (26).

Figure 2:
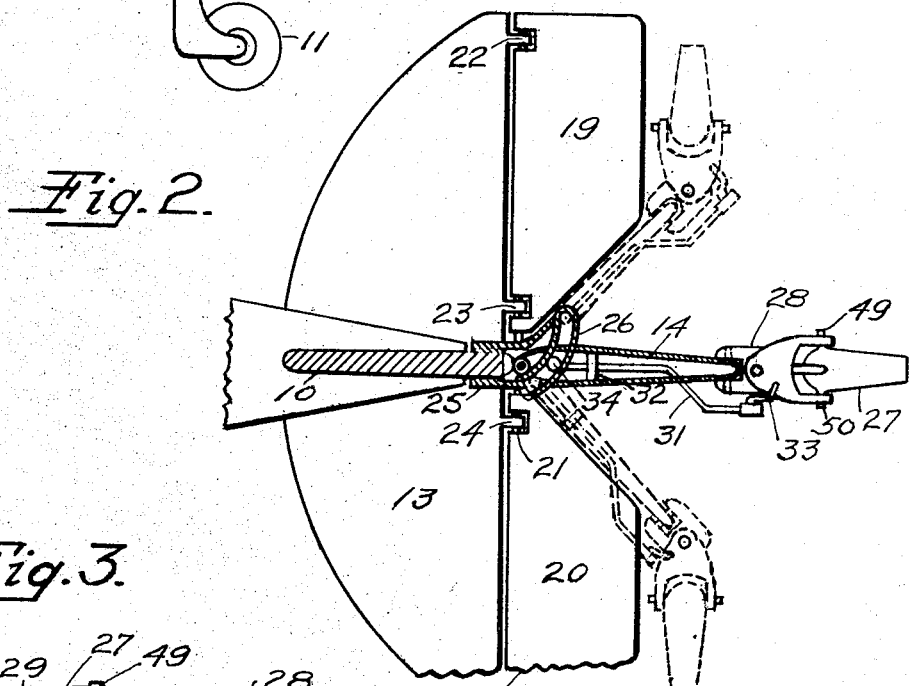
Fig. 2 is a top plan view partially in section of an airplane tail group showing the lateral angular movement of the booster.
Figure 3:
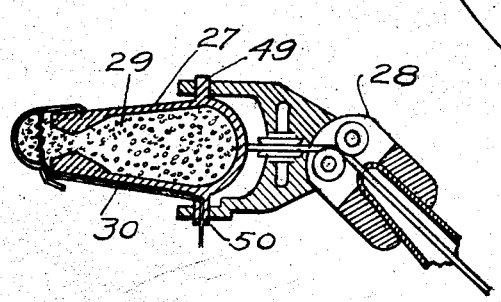
Fig. 3 is a detail sectional view of the booster and a portion of the attaching means.

It will be noted from the construction illustrated that angular movement of the rudder (14) about its hinge pins effects greater relative angular movement of the gun in the same direction, and when the rudder reaches its extreme lateral position, which is about 45° of the central vertical plane of the airplane, the gun is positioned at 90° to said plane as shown in Fig. 2. The relative angular movement of the gun with respect to the rudder is effected by movement of the link (31) and depends on the curvature of the groove in cam (26).

The movement of the gun in a vertical plane is effected by means of the following instrumentalities:

A cam (35) mounted centrally on the axle (21) between the right and left elevators (19) and (20), a vertical cam operated member (36), slidably mounted in upper and lower bearing members (37) and (38) respectively, a sector (39), pivotally mounted on an axis (40) and provided with an arm (41) having a loose pivotal connection to the upper extremity of the vertically slidable member (36) and cables (42) and (43) which pass over pulley rollers (44), (45), (46), (47) and (48), and are connected to opposite ends of the circumferential surface of the sector (39) and to the upper and lower surfaces of the gun to effect pivotal movement thereof about the trunnions (49) and (50).

This pivotal movement of the elevators (19) and (20) about their hinge pins effects greater relative angular movement of the gun, until the elevators reach their extreme lateral position at which location the gun is positioned at 90° to the central horizontal plane of the airplane as shown in Fig. 1.

Thus with the movement of the rudder and elevators in azimuth and elevation the gun is so positioned that when its charge is ignited the gaseous blast and resulting recoil effect provide effective substitute for the aero-dynamic force which normally would be developed by the rudder and elevators if they were functioning properly.

Having described my invention, what I claim as new and wish to secure by Letters Patent is:

1. The combination with the controls of an airplane including the rudder and elevator of a normally inoperative gas producing device mounted upon the trailing edge of the rudder and movable in azimuth and elevation, said device having a gas outlet normally directed toward the rear of the airplane, means associated with said gas device to render said device operative, interacting means between the elevator, rudder and gas producing device for directing the outlet of said device in azimuth and elevation and in accordance with the movements of the controls whereby when said controls have become inoperative the recoil effect of the gas will produce the same directive effect upon the airplane as would the rudder and elevator under normal operating conditions.

2. The combination with the controls of an airplane including the rudder and an elevator, a normally inoperative gas producing device mounted upon the trailing edge of the rudder adjacent its upper end, said device being movable in azimuth and elevation and having a gas outlet normally directed toward the rear of the airplane, electrical means associated with said gas producing device to render the latter operative, and interacting means between the elevator, rudder and gas producing device for directing the outlet of said device in azimuth and elevation in accordance with the movements of the rudder and elevator whereby when said rudder and elevator have become ineffective the recoil effect of the gases generated by said gas producing device will have the same directive effect upon the airplane as would the rudder and elevator under normal operating conditions.

3. The combination with the controls of an airplane including a rudder and elevator, of a normally inoperative gas producing device mounted upon the trailing edge of the rudder and movable in azimuth and elevation, said device including a charge holding cylinder closed at its inner end and having a gas outlet at its outer end, said outlet being directed toward the rear of the airplane, means associated with said gas producing device to render the latter operative, and interacting means between the elevator, rudder and gas producing device for directing the outlet of said device in azimuth and elevation in accordance with the movements of said rudder and elevator whereby when the rudder and elevator have become ineffective, the recoil effect of the generated gases will produce the same directive effect upon the airplane as would the rudder and elevator under normal operating conditions.

4. The combination with the controls of an airplane including a rudder and elevator, of a normally inoperative gas producing device mounted upon the trailing edge of the rudder and movable in azimuth and elevation, said device including a charge holding cylinder closed at its inner end and having a gas outlet at its opposite end, said outlet being directed toward the rear of the airplane, electrical means associated with said gas producing device and under the control of the operator to render the device operative, a mechanism controlled by the rudder and elevator and coacting with the gas producing device to actuate said device in azimuth and elevation in accordance with the movements of rudder and elevator, whereby when said rudder and elevator have become ineffective the recoil effect of the gases generated by the gas producing device will produce the same directive effect upon the airplane as would the rudder and elevator under normal operating conditions.

5. The combination with the controls of an airplane including a rudder and elevator, of a normally inoperative gas producing device mounted upon the trailing edge of the rudder and movable in azimuth and elevation, said device including a charge holding cylinder closed at its inner end and having a gas outlet at its opposite end, said outlet being directed toward the rear of the airplane, electrical means associated with said gas producing device and under the control of the operator, to render said device operative, a mechanism controlled by the rudder and elevator and coacting with the gas producing device to operate said device in azimuth and elevation in accordance with the movements of rudder and elevator, whereby when said rudder and elevator have become ineffective the recoil effect of the gases generated by the gas producing device have the same directive effect upon the airplane as would the rudder and elevator under normal operating conditions.

6. The combination with the controls of an airplane including a rudder and elevator, of a normally inoperative gas producing device mounted upon the trailing edge of the rudder adjacent its upper end and movable in azimuth and elevation, said device including a charge holding cylinder closed at its inner end and having a gas outlet at its opposite end directed toward the rear of the airplane, electrical means associated with said gas producing charge and under the control of the operator to render said device operative and interacting means between the elevator, rudder and gas producing device for directing the outlet of said device in azimuth and elevation in accordance with the movement of said elevator and rudder whereby when the controls are ineffective the recoil effect of the gases generated by the gas producing device will have the same effect upon the airplane as would the rudder and elevator under normal operating conditions.

7. The combination with the controls of an airplane including a rudder and elevator, of a normally inoperative gas producing device mounted upon the trailing edge of the rudder and movable in azimuth and elevation, said device having a gas outlet normally directed toward the rear of the airplane, means associated with said gas producing device to render said device operative, and interacting means between the elevator, rudder and gas producing device for directing in azimuth the outlet of said device anti-clockwise through an angle of 90° with respect to the longitudinal axis of the airplane and clockwise through an angle of 90° with respect to said longitudinal axis of the plane in accordance with the movement of the rudder and for directing said device through an angle of 180°, and in accordance with the movement of the rudder, whereby when the controls have become ineffective the recoil effect of the gas produced by the gas generating device will have the same directive effect upon the airplane as would the rudder and elevator under normal operating conditions.

CHARLES D. FATOR.